Feb. 19, 1924.
G. S. BLAKESLEE
1,484,291
DISH HOLDING BASKET
Filed July 25, 1919
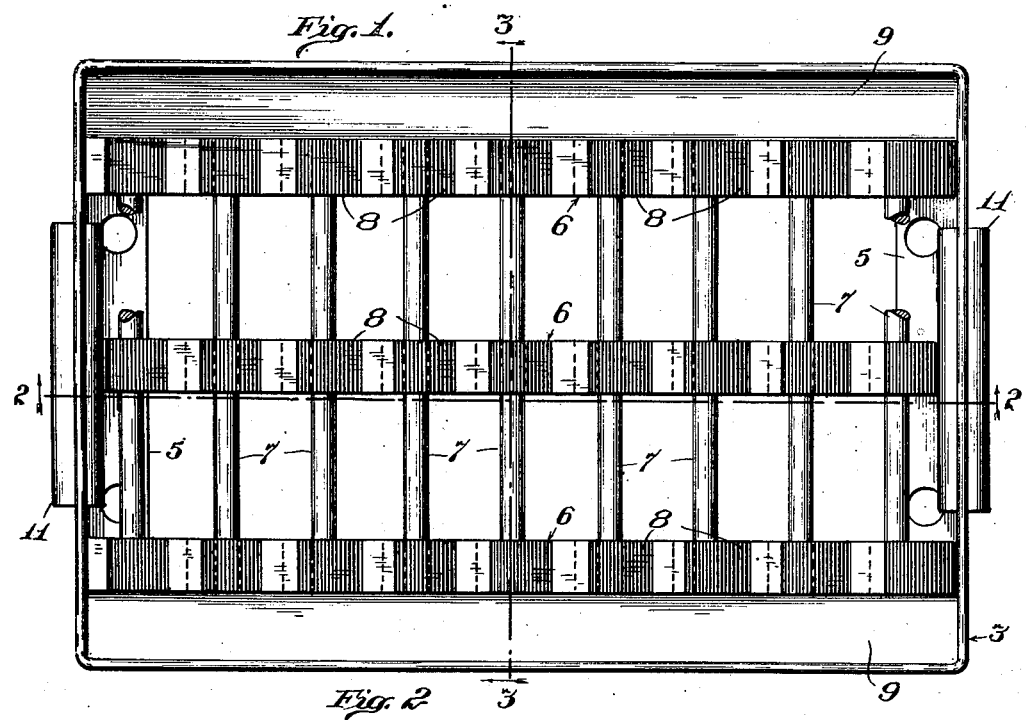
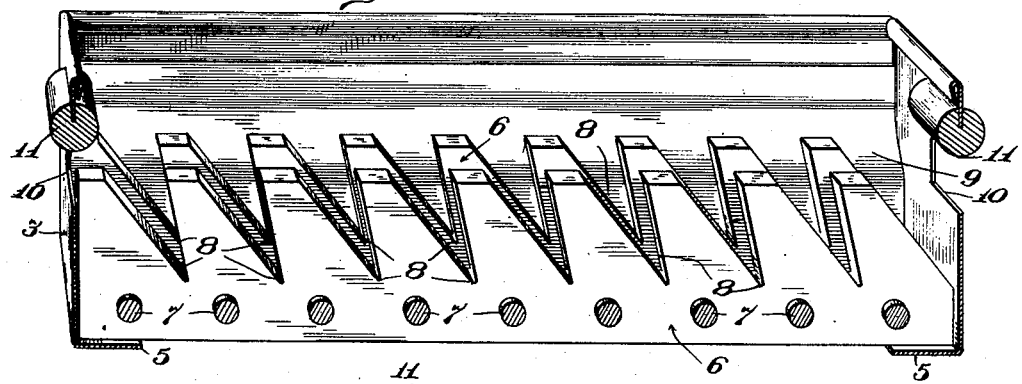
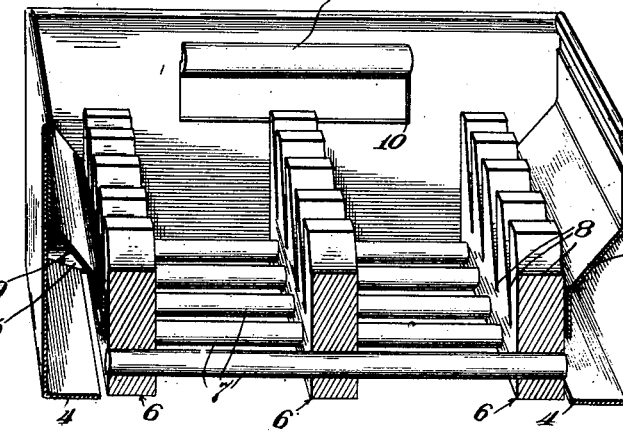
Inventor
George S. Blakeslee,
Adams & Jackson
Attorneys Patented Feb. 19, 1924.

1,484,291

UNITED STATES PATENT OFFICE.

GEORGE S. BLAKESLEE, OF CHICAGO, ILLINOIS.

DISH-HOLDING BASKET.

Application filed July 25, 1919. Serial No. 313,307.

*To all whom it may concern:*

Be it known that I, GEORGE S. BLAKESLEE, a citizen of the United States, and a resident of Chicago, in the county of Cook and State of Illinois, have invented certain new and useful Improvements in Dish-Holding Baskets, of which the following is a specification, reference being had to the accompanying drawings.

My invention relates to dish-holding baskets such as are ordinarily used in connection with dish-washing machines, and has for its object to provide an improved basket which may be effectively employed for holding dishes such as plates, saucers, cups, etc., and which may be cheaply constructed, but will nevertheless be substantial and capable of withstanding the rough usage to which such baskets are apt to be subjected. I accomplish this object as illustrated in the accompanying drawings and as hereinafter described. What I regard as new is set forth in the claims.

In the accompanying drawings,—

Fig. 1 is a plan view of my improved basket;

Fig. 2 is a longitudinal sectional view thereof, substantially on line 2—2 of Fig. 1, and Fig. 3 is a partial perspective view, showing the basket broken away substantially on line 3—3 of Fig. 1.

Referring to the drawings,—3 indicates a rectangular metallic frame open at the top and bottom, and having internally projecting marginal flanges 4, 5 at the lower margins of its sides and ends respectively, as shown in Figs. 2 and 3. These flanges add rigidity to the frame, and the end flanges 5, serve also to support the dish-holding devices hereinafter described.

6 indicates a number of wooden strips which extend longitudinally of the basket and rest upon the end flanges 5, as shown in Fig. 2. These strips are spaced regularly apart and are held in fixed relation to each other by a series of wooden cross-rods 7 fitted in said strips near their lower margins, as shown in Figs. 2 and 3. These cross-rods not only serve to position the longitudinal strips relatively to each other, but also perform the function of supporting small articles, such as cups, which are not wide enough to extend across from one longitudinal strip to the adjacent one. As best shown in Fig. 2, the longitudinal strips 6 are provided with a series of V-shaped notches 8 along their upper margins, the notches in the different strips being alined so that the edge of a dish, such as a plate, may be fitted in the corresponding notches of two adjoining strips and will be held in an approximately upright position. Preferably, the notches 8 are inclined, as shown in Fig. 2, so that the dishes are not held in a vertical position, but rather in a position somewhat inclined from the vertical, so that water thrown upon them strikes them with greater force and therefore has a more effective cleansing action. The strips 6 and cross-rods 7 are made of wood so that dishes dropped upon them are less apt to be damaged.

9 indicates sheet metal deflectors which are secured to the side members of the frame 3 and extend longitudinally thereof, said deflectors being inclined downward and inward toward the adjacent strips 6, as shown in Fig. 3, so that they operate to direct water thrown into the basket from above laterally toward the dishes.

10 indicates transverse slots formed in the end portions of the frame near their upper margins to provide hand holds for convenience in handling the basket. Rounded strips or handles 11, having grooves of suitable width, are fitted over the upper edges of said slots, as shown in Figs. 2 and 3, so that the basket may be comfortably handled.

My improved basket may be very easily and cheaply constructed as the parts are simple and inexpensive, but it is nevertheless substantial in construction. The dish-holding strips reinforce the metallic frame and increase its strength and rigidity.

What I claim is:—

1. A dish-holding basket for use in dish washing machines comprising a rectangular metal frame, a plurality of narrow strips disposed on edge therein parallel with and spaced apart from each other, said strips having alined V-shaped notches in their upper margins, and a plurality of transverse rods connecting said strips above the lower margins thereof.

2. A dish-holding basket for use in dish washing machines comprising a rectangular metal frame open at the top and bottom, deflecting plates connected with the side members of said frame and extending downward and inward therefrom and operating to direct water thrown into the basket from above laterally toward the dishes, and means in said frame for supporting the articles to be washed.

3. A dish-holding basket for use in dish washing machines comprising a rectangular metal frame, a plurality of narrow strips disposed therein parallel with and spaced apart from each other, said strips having notches in their upper margins, and deflecting plates connected with the side members of said frame and extending downward toward the adjacent strips and operating to direct water thrown into the basket from above laterally toward the dishes.

4. A dish-holding basket for use in dish washing machines comprising a rectangular metal frame, dish-supporting devices mounted in said frame, slots in the opposite end portions of said frame, and wooden strips having grooves which receive the upper margins of said slots, to form handles for the basket.

GEORGE S. BLAKESLEE.